Patented Apr. 15, 1941

2,238,714

UNITED STATES PATENT OFFICE 2,238,714

PURIFICATION OF ALKYL ETHERS OF CELLULOSE

Clarence Floyd Wells, Marshallton, Del., assignor, by mesne assignments, to E. I. du Pont de Nemours & Company, Wilmington, Del., a corporation of Delaware No Drawing. Application July 25, 1936, Serial No. 92,606

2 Claims. (Cl. 260—232)

This invention relates to cellulose ethers and more particularly to the manufacture of cellulose ethers of a very desirable chemical purity and physical form.

A well known method for the manufacture of ethyl cellulose consists in mixing cellulose, caustic soda, water, and ethyl chloride with or without a liquid organic diluent, such as benzene or toluene in an autoclave under pressure at elevated temperatures for several hours. The reaction product mixture comprises a more or less viscous solution of ethyl cellulose dissolved in the diluent (such as benzene), excess ethyl chloride, ethyl alcohol and ethyl ether (the alcohol and the ether being by-products of the reaction) together with any excess caustic soda solution and crystals of sodium chloride.

In isolating the ethyl cellulose thus produced, it has been the practice to steam distill the mixture to remove the organic solvents (diluent, alcohol, ether and ethyl chloride). As the solvents are removed the ethyl cellulose solution passes through a plastic stage after which it separates in the form of tough, dense lumps. After the distillation of the organic compounds the ethyl cellulose remains as a solid suspended in an aqueous solution of sodium chloride and sodium hydroxide. The usual procedure has then been to wash with water in an effort to remove the alkali metal compounds from the ethyl cellulose. The ethyl cellulose in the aforementioned physical form is very resistant to purification treatments and it has, therefore, been very difficult, if not impossible, to obtain in this manner a product having desirable purity. Since the density and the relatively large particle size of the ethyl cellulose are known to accentuate the difficulty of purification, grinding of the partially purified lumps has been proposed. It is very difficult to control the particle size in the procedure described above and if grinding could be resorted to it would obviously perform the double function of aiding in purification and regulating particle size. Grinding, however, has been found to be a difficult and undesirable step. The unground lumps are very difficult to dissolve or colloid. The necessity of choosing between grinding or utilization of impure particles difficult to further process has, therefore, placed the manufacturer of cellulose ethers in a great strait.

It has now been discovered that cellulose ethers (such as ethyl cellulose) may be produced in a much finer physical form and in a condition in which they can be much more readily purified, dissolved and colloided than was heretofore thought possible.

This invention had for an object the preparation of cellulose ethers in a purer and more desirable physical form. Further objects were the precipitation of ethyl cellulose in a form in which impurities could be more readily removed during purification treatments, in which water could be more readily removed during drying operations and which could be more easily dissolved and colloided than known products. Another object was to devise an improved method for the precipitaiton and purification of cellulose ethers, such as ethyl cellulose.

Still further objects were to devise new chemical and/or physical processes, to produce new chemical and/or physical compounds and to prepare cellulose ethers in a very desirable physical form and in a high degree of purity.

A general advance in the art and other objects which will appear hereinafter are also contemplated.

The foregoing objects and related ends are accomplished in the manner set out in the following description in which details of what is believed to be the best mode for carrying out the invention are disclosed.

These objects are accomplished by this invention according to which the crude etherification mixture is formed into a very fluid emulsion and the said emulsion in a state of fine subdivision brought into contact with a relatively large volume of vigorously agitated hot water, maintained at a temperature well above the boiling point of the organic solvents to be removed.

The invention will be further understood by a consideration of the following detailed description and illustrative specific examples in which the quantities, unless otherwise indicated, are given in parts by weight.

Example I

Twenty-six hundred (2600) parts of alkali cellulose (prepared by steeping cellulose in 22 per cent caustic soda solution and pressing out the excess liquor) containing approximately 1000 parts of cellulose, 475 parts of caustic soda, and 1125 parts of water were mixed with 1885 parts of solid caustic, and shredded until the mixture was uniform. To the resulting mixture in an autoclave were added 3480 parts of ethyl chloride, 65 additional parts of water, and 5660 parts of benzene and the resultant stirred and heated for six to eight hours at 150° to 160° C. Ten (10) parts of Turkey red oil and 1000 parts of water were added to the reaction mass, after cooling, and the mixture stirred to obtain uniform incorporation of the water and emulsifying agent. The resulting uniform, viscous emulsion was thinned with 1000 parts of benzene and 500 parts of ethyl alcohol and run slowly in a small stream into boiling water maintained in a state of violent agitation and continually heated by the injection of live steam. The steam bubbling vigorously up through the water carried the volatile organic compounds out of the precipitating container. The ethyl cellulose was precipitated in a fine, fluffy, fibrous form and was readily purified by washing with water.

Example II

One thousand (1000) grams of cellulose in the form of granules prepared according to the disclosure in U. S. Patent 1,872,181, dated August 16, 1932, 2360 grams of caustic soda, 1190 grams of water, 3300 grams of propyl chloride and 5660 grams of benzene were added to an autoclave, stirred and heated for eight hours at 150° to 160° C. One thousand (1000) grams of water were added to the reaction mass directly (in an alternative procedure the addition was made after cooling) and the mixture stirred to obtain a thorough incorporation of the water with the propyl cellulose reaction mixture.

The resulting uniform, viscous emulsion was precipitated (without further dilution with solvents) in the same manner as described in Example I. The propyl cellulose thus precipitated was in a fine, fluffy, fibrous form and was readily purified by washing.

Example III

Two thousand three hundred and sixty (2360) grams of caustic soda, 1190 grams of water, and 5660 grams of benzene were added to an autoclave, stirred and heated to 70° C. The caustic soda dissolved in the water and the resulting caustic solution was emulsified (or extremely finely dispersed) in the benzene. At this point 1000 grams of cellulose in the form of granules prepared according to the disclosure in U. S. Patent No. 2,067,946, issued Jan. 19, 1937 to Picton were added and, the mixture stirred for fifteen minutes and then 2800 grams of ethyl chloride added, the stirring was continued and the reaction mass heated at 140° to 160° C. for six to eight hours. A solution of ten grams of Turkey red oil in 7800 grams of water was added to the reaction mass while hot and the mixture stirred to obtain uniform incorporation of the emulsifying agent and to dissolve the sodium chloride. The resulting emulsion was passed through a filter and run directly into the precipitating bath. The ethyl cellulose was precipitated in the same manner as described in Example I.

Example IV

Two thousand three hundred and sixty (2360) grams of caustic soda, 1190 grams of water and 5660 grams of benzene are added to the autoclave and stirred and heated to 70° C.

The caustic soda dissolved in the water and the resulting caustic solution was emulsified in the benzene. At this point 1000 grams of cellulose in the form of dense chips were added and the mixture stirred for one hour during which time the temperature has been allowed to rise to 85° to 90° C. and then 3480 grams of ethyl chloride was added and the mixture stirred and heated at 140° to 160° C. for six to eight hours. The crude ethyl cellulose mixture was then sprayed downwards into a tall column through which live steam was passing upwards, counter currently, (in an alternative procedure the crude solution was atomized by dropping onto a disc which was revolving at a high speed inside of a heated chamber through which live steam was circulated). The ethyl cellulose was deposited in a finely divided form and purified (readily) by washing.

Example V

Twenty-six hundred (2600) grams of alkali cellulose (prepared by steeping cellulose in 22 per cent caustic soda solution and pressing out the excess liquor) containing approximately 1000 grams of cellulose, 475 grams of caustic soda, and 1125 grams of water were treated with 1885 grams of solid caustic, and shredded until the mixture was uniform. The resulting mixture, 3480 grams of ethyl chloride, 65 grams of additional water, and 5660 grams of benzene were placed in an autoclave and stirred and heated for six to eight hours at 150° to 160° C. Ten (10) grams of Turkey red oil and 1000 grams of water were added to the reaction mass before cooling and the mixture stirred to obtain uniform incorporation of the water and emulsifying agent.

The resulting uniform, viscous emulsion was thinned with 1000 grams of benzene and 500 grams of alcohol to about the fluidity of viscose and then run slowly in a small stream into boiling water which was being rapidly stirred and continually heated by the injection of live steam. The steam bubbling vigorously up through the water carried the volatile solvents out of the precipitating container. The ethyl cellulose as precipitated was in a fine, fluffy, fibrous form and was readily purified by washing.

The present process, although applicable with special advantage to the purification of ethyl cellulose reaction mixtures, may be applied also to other crude cellulose ethers, such as propyl cellulose, butyl cellulose, methyl ethyl cellulose, ethyl propyl cellulose, ethyl glycol cellulose and the like, provided they do not contain organic solvents having too high a boiling point. The crude cellulose ethers in undesirable physical and chemical condition may be successfully converted to the new finely divided form according to this invention by dissolving in a volatile solvent and precipitating in the manner set out above.

In general emulsifying agents effective in alkaline solution may be employed. Such compounds as sodium oleate, alkali salts of petroleum sulfonic acids and naphthenic acids, alkali salts of fatty acids containing over four carbon atoms, sodium lauryl sulfate and other alkali salts of long chain alkyl acid sulfates, salts of alkyl naphthalene acids such as isopropylated naphthalene sulfonic acid and the like are eminently suited for use in the above described processes. The emulsifying agent selected for any specific process depends largely upon the particular cellulose ether solution to be emulsified. The amount of such reagent may be varied. From 1 to 10 per cent (based on the cellulose ether) is usually ample. At the expense of economy and efficiency larger amounts may be employed when desired. In some instances an emulsion can be obtained without the addition of an emulsifying agent.

The amount of water added along with the emulsifying agent may be varied within wide limits. In some cases the reaction mixture contains sufficient water so that no water need be added with the emulsifying agent. In other cases where the reaction mixture is to be filtered sufficient water should be added to dissolve the salt formed during the reaction.

The time of stirring in order to obtain uniform incorporation of the emulsifying (dispersing) agent will vary within wide limits, depending principally upon the type of cellulose ether being prepared. The particular amount of time necessary in each instance can be readily and quickly determined upon an empirical basis.

Provided the emulsion of the cellulose ether is sufficiently finely dispersed in the hot aqueous liquid to permit instantaneous flashing off of the volatile solvents, the rate at which the emulsion is passed into the precipitating bath may vary widely. This factor can easily be adjusted to accommodate the desires of the person operating the process and the limitations of the apparatus in which the precipitation is being carried out.

As indicated above, the emulsion may be thinned with a volatile solvent if an increase in fluidity is necessary or desired. Additional amounts of the compounds already present in the emulsion (or mixture to be emulsified) or extraneous materials may be utilized for this purpose.

The emulsion may be separated into fine particles by any of the well known mechanical expedients such as atomizing, spraying and the like. The fine stream of emulsion may be brought into contact with steam or a vigorously agitated aqueous liquid maintained well above the boiling point of the organic liquids to be removed. In case a body of aqueous liquid is utilized the emulsion may be sprayed onto or injected below the surface.

As will be apparent the herein described process causes the organic solvent to be vaporized almost instantly and the cellulose ether to be precipitated in a fine, fluffy, fibrous form which may be readily separated from water soluble impurities by washing. This new method of manufacturing cellulose ethers is economical and advantageous in practice. The time required for purification of the cellulose ether is lessened by at least 50 per cent and when the purified cellulose ethers are processed into films the resultant films are much clearer than those prepared from ethyl cellulose isolated and purified by known processes. The physical form of the cellulose ether is easily controlled, its purification is greatly simplified, its drying is greatly facilitated, and the product obtained dissolves readily and colloids easily when the process of this invention is employed.

As many apparently widely different embodiments of this invention may be made without departing from the spirit and scope thereof, it is to be understood that I do not limit myself to the specific embodiments thereof except as defined in the appended claims.

I claim:

1. The process which comprises mixing 2600 parts of alkali cellulose equivalent to approximately 1000 parts of cellulose, 475 parts of caustic soda, and 1125 parts of water with 1885 parts of solid caustic, shredding until the mixture is uniform, mixing with 3480 parts of ethyl chloride, 65 parts of water, 5660 parts of benzene, stirring and heating for six to eight hours while maintaining a temperature of 150° to 160° C., adding 10 parts of Turkey red oil, adding 1000 parts of water, emulsifying the resultant, thinning the emulsion with 1000 parts of benzene and 500 parts of ethyl alcohol, running the emulsion in the form of a fine stream into vigorously agitated boiling water, maintaining the water in a boiling condition until all the emulsion is added and filtering the solid ethyl cellulose from the aqueous solution in which it has been precipitated.

2. The product obtainable by mixing 2600 parts of alkali cellulose equivalent to approximately 1000 parts of cellulose, 475 parts of caustic soda, and 1125 parts of water with 1885 parts of solid caustic, shredding until the mixture is uniform, mixing with 3480 parts of ethyl chloride, 65 parts of water and 5660 parts of benzene, stirring and heating for six to eight hours while maintaining a temperature of 150° to 160° C., adding 10 parts of Turkey red oil, adding 1000 parts of water, emulsifying the resultant, thinning the emulsion with 1000 parts of benzene and 500 parts of ethyl alcohol, running the emulsion in the form of a fine stream into vigorously agitated boiling water, maintaining the water in a boiling condition until all the emulsion is added and filtering the solid ethyl cellulose from the aqueous solution in which it has been precipitated.

CLARENCE FLOYD WELLS.